July 4, 1944.        W. L. DOUDEN        2,352,777
RANGE FINDER
Filed April 30, 1942
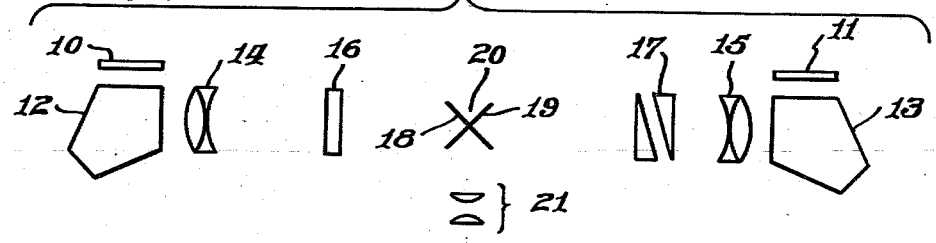
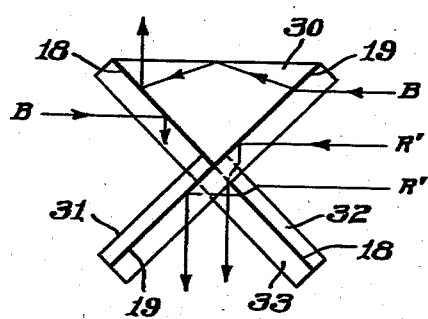
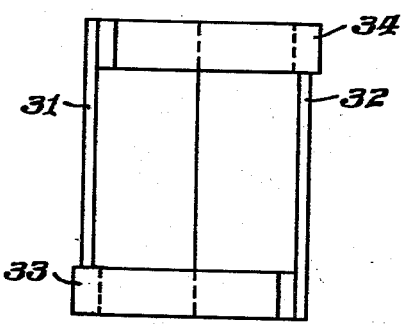
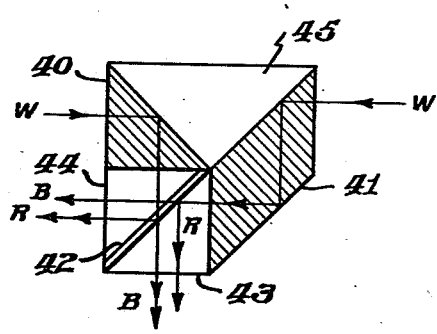
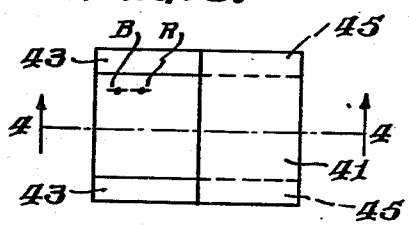
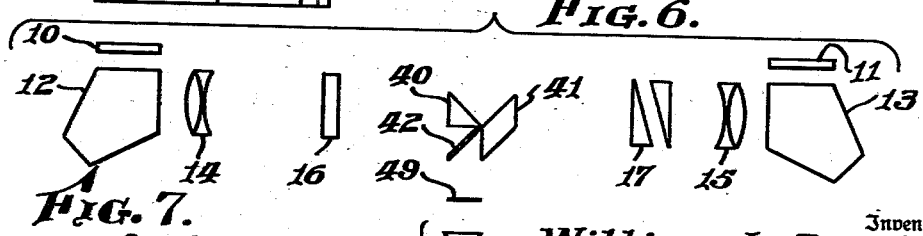
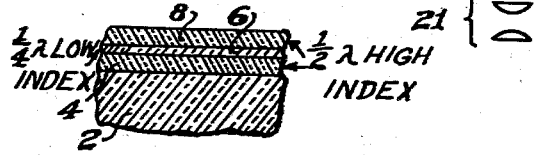
Inventor
William L. Douden
By C. D. Tuska
Attorney Patented July 4, 1944

2,352,777

UNITED STATES PATENT OFFICE 2,352,777

RANGE FINDER

William L. Douden, Philadelphia, Pa., assignor to Radio Corporation of America, a corporation of Delaware Application April 30, 1942, Serial No. 441,093

7 Claims. (Cl. 88—2.7)

This invention relates to range finders and particularly to a precision range finder of the coincidence type having a wide field of view over which the coincidence may be secured. This range finder is an improvement on that described and claimed in the application of Eugene G. Lurcott, Serial No. 440,903, filed April 29, 1942. In the Lurcott application, there is described a range finder of the movable mirror type which incorporates a novel type of beam splitting device. The Lurcott range finder is of the movable mirror type ordinarily used in conjunction with cameras and similar devices where a high degree of precision is not required and due to the unequal optical paths the field is limited to that of the longer optical path, thereby making rapid determination of the range of small objects difficult.

The present device is an improvement on the one referred to above in that it makes the optical paths equal and follows the customary precision range finder practice insofar as is practical, but at the same time includes the improvements of the Lurcott invention in a modified form so as to permit securing proper coincidence on very small objects in any portion of the field of the instrument and at the same time secure accurate determination of the coincidence of the images. It will be apparent to those skilled in the art that a coincidence type of range finder in which coincidence may be secured in any portion of the field presents considerable advantages in the rapid determination of the range of such rapidly moving objects as, for example, airplanes or small high speed boats, as a continuous reading of the rapidly changing range may be secured.

One object of the invention is to provide an improved range finder.

Another object of the invention is to provide an improved coincidence type of range finder.

Another object is to provide an improved superposed image coincidence type of range finder which will give a wide field in improved illumination.

Another object of the invention is to provide an improved range finder which will provide a color separation of the several images without light loss.

Another object is to provide a precision range finder which will provide an image in its true colors only when the apparatus is properly adjusted for range and which will show such image with a brilliance and contrast greater than that of previous types of coincidence range finders.

Other and incidental objects of the invention will be apparent to those skilled in the art from a reading of the following specification and an inspection of the accompanying drawing in which: Figure 1 is a schematic diagram of the optical elements of one form of my invention; Figure 2 is a plan view showing the construction of the beam splitter and combiner used in Figure 1; Figure 3 is an elevation taken from the bottom of Figure 2; Figure 4 shows a modified form of beam splitter and combiner; Figure 5 is an elevation taken from the bottom of Figure 4; Figure 6 is a schematic illustration of the preferred form of the invention including the beam combining device of Figures 4 and 5, and Figure 7 is an enlarged cross-sectional view of the selectively reflecting surfaces.

Referring first to the form of invention referred to in Fig. 1, which shows one way of adapting the invention to a conventional precision range finder: The range finder is provided with the usual tube and mounting elements, which are not shown as they are not pertinent to the invention, only the optical elements being illustrated. Light enters through the spaced cover glasses 10 and 11 and is reflected through the aligned penta-prisms 12 and 13 through the objectives 14 and 15 on the axis of the range finder. In the lefthand portion of the range finder, the usual compensating plate 16 is shown while in the righthand portion, there are provided the usual relatively movable prisms 17 for adjusting the deflection of the beam entering through the righthand cover glass 11. Although these prisms are shown as being of the axially movable type, it will be apparent to those skilled in the art that the relatively rotatable prisms may be substituted if desired. The beam from the lefthand side of the range finder strikes the diagonal reflecting surface 18 and is reflected to the eye piece 21 while the beam from the righthand side of the range finder strikes the intersecting diagonal surface 19 and is likewise reflected to the eye piece 21. The surfaces 18 and 19 are complementary selective reflectors constructed as described and claimed in the application of Glenn L. Dimmick, Serial No. 436,998, filed March 31, 1942, and will be more specifically described hereafter. The surface 18 may be so constructed as to reflect, for example, blue light and transmit the complementary red components of the beam, while the surface 19 may be so constructed as to reflect red light and transmit the complementary blue portion of the beam. It will be understood, of course, that these colors are given as illustrative and that any two color sections of the spectrum may be used which are visually complementary.

The selectively reflecting surface, shown in Figure 7 and referred to above, is described in the Dimmick application referred to as consisting of three transparent layers evaporated onto the surface of a supporting material 2 such, for example, as glass. These layers consist of a layer 4 of high index material such as zinc sulphide having a thickness of one-half of the wave length which is to be selectively transmitted, then a layer 6 of low index material such as calcium fluoride having a thickness of one-quarter of the wave length of the light which should be transmitted and a final layer 8 of zinc sulphide or similar high index material having a thickness of one-half of the wave length of light to be transmitted, like the first layer. As described in the said application, this layer will transmit one portion of the spectrum and reflect the complementary portion with no light loss whatever.

These thin films, having a thickness at the most of only a few hundred thousandths of an inch, are obviously not self-supporting and, therefore, must be provided with suitable supports which will maintain them accurately in position.

Such a supporting mechanism is shown in Fig. 2. In this form of supporting mechanism, a 90° prism 30 is provided which has one face coated with the selective layer 18 and the face at 90° thereto coated with the selective layer 19, the hypotenuse being preferably polished to avoid diffuse reflections. Plane parallel faced plates 31 and 32, disposed normal to each other, are provided, one face of the plate 31 being provided with a coating 19 in alignment with the corresponding face of the prism 30 and one face of the plate 32 being provided with a coating 18 and in alignment with the coating 18 on the prism 30. These plates should, of course, be optically flat and the faces thereof should be parallel to a degree corresponding to the precision required of the range finder. The manner in which these surfaces are held in optical alignment is shown in Fig. 3 taken in conjunction with Fig. 2. As shown in Figs. 2 and 3, a bar of appropriate material, such as glass, 33 is secured, adjacent the lower edges thereof, to the face of the prism 30 carrying the coating 18 and to the face of the plate 32 which is less, in length, than the prism 30 by an amount equal to the width of the bar 34. The upper portions of the prism 30 and the plate 31 are likewise secured to the bar 33. In order to accomplish this securing, the face of the bar 33 should be optically flat and polished and it may then be wrung into contact with the face of the prism 30 and the face of the plane parallel 32 with a small drop of ether between the surfaces. After the ether has evaporated, the surfaces are in molecular contact and will remain inseparable by forces less than those sufficient to fracture the plate 32. The plate 31 having the coating 19 is similarly fixed in relation to the face 19 of the prism 30 by the bar 34. If desired, a minute amount of adhesive may be added to the ether or other highly volatile material used in securing the plates together, but this adhesive should be so small in quantity that it cannot interfere with the optical alignment of the parts. If desired, the portions of this beam splitter may also be secured into an appropriate fixture by casting an appropriate low melting point metal around them after they have been secured in proper optical relation although a spring mounting is to be preferred to avoid unnecessary strains in the parts.

It will be apparent from Fig. 2 that although one portion of each beam, such as R at the right of Fig. 2, is reflected from the front surface such as 19 without previous reflection and a second portion of the beam such as R' is first reflected through plate 32 and then reflected at the surface 19 on the plate 31, the reflections of the two beams will compensate since both beams strike the plate 32 at an angle of 45° and the amount of displacement of the two beams will be equal.

The form of the invention just described is subject to the manufacturing difficulty of making the two films 18 and 19 visually complementary in their reflections and there is also the difficulty of getting the plane parallel plates exactly at 90° to each other and in alignment with the prism faces. The form of beam splitting and combining prism shown in Figs. 4, 5 and 6 is more practical since it provides a more rigid construction and uses only a single beam splitting film which inherently transmits a color complementary to that reflected. In this form of the invention, the beams from the objectives 14 and 15 respectively enter the reflecting prisms 40 and 41. The beam entering the prism 40 is reflected through an angle of 90° to the dichroic film 42 which is provided on an appropriate plane parallel plate, the blue component of the beam, for example, being transmitted through the plate while the red component is reflected, as indicated in the drawing. The white light from the beam entering the prism 41 is reflected twice within this prism as shown and strikes the opposite face of the light divider 42, the red component of the beam being reflected toward the eye piece and the blue component being transmitted through the film in the same direction as the reflected beam entering from the prism 40. The beams emerging from the plate 42 are shown as somewhat displaced as would be the case when the instrument is not adjusted for the particular range of the object being viewed.

The assembly of this prism is different from that of the beam combining device of Fig. 2 and it may be made considerably more rigid. The prisms 40 and 41 and the beam splitter 42 are made somewhat higher than is required for the field area to be used and the unit is then assembled with the aid of auxiliary fillers or prisms 43, 44, and 45. These filler members are preferably made of glass and are optically surfaced with the same degree of precision as the prisms. The members 45, of which there is one at the top and one at the bottom, are in the form of 90° prisms, each having a height of thickness equal to half the difference between the length of the prism 40 and the height of field required. The prisms 40 and 41 are cemented or clamped, or both, against the face of the filler prisms 45 thereby maintaining the faces of the reflecting prisms 40 and 41 in proper angular relation. The filler prisms 43 and 44 are made of the same thickness as the prisms 45 and are correspondingly secured to the exit faces of the prisms 41 and 40 and hold the plane parallel plate supporting the film 42 securely between their hypotenuse faces.

The reason for using the type of construction above described is that a color selective film useful as a diagonal face in an optical cube, is not yet commercially available. It will be apparent to those skilled in the art, however, that when such a color selective film is available that solid optical elements may be used on each side of the selective surface 42 such a construction will fall within the scope of the invention.

Fig. 5 shows the manner in which a small distant object at a range for which the instrument is not adjusted appears in the field of the instrument. The image B, for example, coming from the lefthand objective appears blue and separated from the red image R coming from the righthand objective, the representation in this instance being that of a distant airplane approaching nose-on. Proper adjustment of the deflection prisms 17 will bring these images into coincidence causing a single image in its natural colors instead of the two separated colored images.

It will be apparent to those skilled in the art that due to the wide field over which coincidence may be secured in this instrument, it is not necessary for the axes of the instrument to be pointed directly at the object during the securing of such coincidence. However, if there is any question about curvature of field or lack of precision in the edges of the field, the image may be gradually brought to the center of the field during the adjustment of the prisms and accurate centering of the image in the field may then be determined with the assistance of a reticule 49 located in proper relation to the eye piece 21 so that the cross lines on the said reticule will appear in proper focus in the eye piece. With this particular arrangement, the instruments may be used directly as a gun sight over moderate ranges and reasonable angles of fire, the range finder being connected directly to the gun elevating mechanism through a connection controlled by the mechanism for adjusting the prisms 17. As the prisms 17 are brought farther apart indicating decreasing range, the altitude adjustment of the spaced objective axes of the range finder would be brought more nearly into parallelism with the bore of the gun; and conversely as the range increased and the spacing of the prisms 17 decreased, the optical axis of spaced light beams and more particularly of the lefthand light beam entering through the cover plate 10 would be depressed below the bore axis by an amount sufficient to allow for the trajectory of the projectile.

All of the optical faces in this instrument are preferably provided with a reflection reducing coating, the outer faces of the windows 10 and 11 being treated in accordance with Nicoll application Serial No. 406,601, filed August 13, 1941, and the remaining faces being preferably coated in accordance with the application of Glenn L. Dimmick, Serial No. 432,836, filed February 28, 1942, the said Nicoll application involving an etching process which leaves a residue having a thickness of a quarter wavelength of the light which is to be primarily transmitted, and the Dimmick application involving the application of an evaporated coating of $CAF_2$ and $ALF_3$ eutectic to a thickness of a quarter of the wavelength of the light which is to be preponderantly transmitted. The reason for this preference in coating is that the Dimmick coating is applicable to any type of glass, whereas the Nicoll coating is primarily applicable to crown glasses and is much more resistant to the action of salt water than the coating described by Dimmick.

It will be apparent that in an apparatus of the type described, the thickness of the coating should be chosen with proper regard to the light which is to be used from that particular portion of the system. For example, in the apparatus as shown, the righthand side of the instrument should be treated to preponderantly transmit the red light which is to be used, and the greater wave-length thickness of the coating should preferably correspond to the light reflected by the layer 19 in Fig. 1 and layer 42 in Fig. 6. In the lefthand side of the instrument, however, the coating should preponderantly transmit the blue light which is reflected by the coating 18 in Fig. 1 and transmitted by the coating 42 in Fig. 6. By thus selecting the thickness of the reflection reducing coatings, the light transmission from the two sides of the instrument will be properly balanced and at the same time maximum optical efficiency will be secured. Alternatively, the thickness of all the coatings may be so chosen that the transmission of the two complementary portions of the spectrum will be equal and corresponding interchangeability of the several optical elements will be secured.

This treatment, together with the improved beam splitter described, which has no light loss, greatly improves the overall optical efficiency of the instrument. A conventional range finder, for example, having eighteen glass-to-air surfaces from the cover plate to the eye has a transmission only of the order of 54 percent, approximately 4 percent light loss occurring at each surface. If the lenses are properly coated, the light loss for a particular color becomes negligible and the overall light loss in the instrument from reflection becomes less than the loss from absorption in the transmitting media, the total transmission being increased to something of the order of 95 percent. This is of advantage both in measurement in very dim light where viewing of the object is difficult and in the case of very bright light directed into the instrument. In the first case, the overall illumination is increased, while in the latter case the contrast is increased, both thereby correspondingly increasing the visibility.

I claim as my invention:

1. A range finder including means defining spaced entrance apertures, means at said apertures deflecting entrant beams of light toward each other along substantially coaxial paths, and means including a pair of different complementary selective light reflectors disposed substantially midway between said entrance apertures for separating and combining portions of said two beams complementary in color.

2. A range finder including means defining spaced entrance apertures, means at said apertures deflecting entrant beams of light toward each other along substantially coaxial paths, and means including a pair of different complementary selective light reflectors disposed substantially midway between said entrance apertures for separating and combining spectroscopically complementary portions of said two beams.

3. A range finder including means defining spaced entrance apertures, means at said apertures deflecting entrant beams of light toward each other along substantially coaxial paths, objective lenses in said paths, means including a pair of different complementary selective light reflectors disposed substantially midway between said entrance apertures for separating and combining portions of said two beams of complementary colors and an eyepiece for viewing said combined beams.

4. A range finder including means defining spaced entrance apertures, means at said apertures deflecting entrant beams of light toward each other along substantially coaxial paths, objective lenses in said paths, means including a pair of different complementary selective light reflectors disposed substantially midway between said entrance apertures for separating and combining spectroscopically complementary portions of said two beams, and an eyepiece for viewing said combined beams.

5. A range finder including means defining spaced entrance apertures, means at said apertures deflecting entrant beams of light toward each other along substantially coaxial paths, objective lenses in said paths, means including a pair of different complementary selective light reflectors disposed substantially midway between said entrance apertures for separating and combining portions of said two beams complementary in color, means for deflecting at least one of said beams to cause corresponding portions of said beams to coincide, and an eyepiece for viewing said combined beams.

6. A device of the type described in claim 4 including a reticule interposed between said selective light reflectors and said eyepiece.

7. A device of the type described in claim 5 including a reticule interposed between said selective light reflectors and said eyepiece.

WILLIAM L. DOUDEN.